United States Patent  
Cerutti (10) Patent No.: US 7,837,288 B2
(45) Date of Patent: Nov. 23, 2010

(54) INKJET PRINTHEAD AND A METHOD OF INKJET PRINTING

(75) Inventor: Walter Cerutti, Arnad (IT)

(73) Assignee: Telecom Italia S.p.A., Milan (IT)

( * ) Notice: Subject to any disclaimer, the term of this patent is extended or adjusted under 35 U.S.C. 154(b) by 249 days.

(21) Appl. No.: 12/158,954

(22) PCT Filed: Dec. 23, 2005

(86) PCT No.: PCT/EP2005/013992

§ 371 (c)(1),
(2), (4) Date: Aug. 14, 2008

(87) PCT Pub. No.: WO2007/073750

PCT Pub. Date: Jul. 5, 2007

(65) Prior Publication Data

US 2009/0284558 A1    Nov. 19, 2009

(51) Int. Cl.
*B41J 29/38* (2006.01)

(52) U.S. Cl. .................................... 347/12

(58) Field of Classification Search ............... 347/12
See application file for complete search history.

(56) References Cited

U.S. PATENT DOCUMENTS

| | | | |
|---|---|---|---|
| 5,485,178 A | 1/1996 | Tateyama et al. | |
| 5,543,828 A * | 8/1996 | Minowa | 347/12 |
| 5,940,095 A * | 8/1999 | Parish et al. | 347/19 |
| 6,543,882 B2 | 4/2003 | Axtell et al. | |
| 2003/0197748 A1 * | 10/2003 | Torgerson et al. | 347/12 |
| 2004/0013019 A1 | 1/2004 | Otose | |
| 2005/0190217 A1 | 9/2005 | Wade et al. | |

OTHER PUBLICATIONS

International Search Report issued in PCT/EP2005/013992 dated Oct. 6, 2006.
Written Opinion issued in PCT/EP2005/013992 dated Oct. 6, 2006.

* cited by examiner

*Primary Examiner*—Matthew Luu
*Assistant Examiner*—Shelby Fidler
(74) *Attorney, Agent, or Firm*—Venable LLP; Robert Kinberg; Steven J. Schwarz (57) ABSTRACT

An inkjet printhead includes a plurality of firing cells, each adapted to generate an ink droplet. The firing cells are arranged to form a plurality of matrices. A control circuit selectively activates the firing cells. The control circuit includes a first dynamic memory register for storing main printing data defining which firing cells have to be activated in a first printing operation. A second dynamic memory register stores auxiliary printing data defining which firing cells have to be activated in a second printing operation. A processing unit is operatively associated with the first and second memory registers to transfer the auxiliary printing data into the first memory register, thereby defining which firing cells have to be activated in the second printing operation. A firing unit sends a single firing signal common to all the matrices for each printing operation. Also disclosed is a method of inkjet printing.

24 Claims, 6 Drawing Sheets

| Row | Bus channels | |
|---|---|---|
| 1 | CH7 | CH6 |
| 2 | CH7 | CH5 |
| 3 | CH7 | CH4 |
| 4 | CH7 | CH1 |
| 5 | CH6 | CH5 |
| 6 | CH6 | CH4 |
| 7 | CH6 | CH3 |
| 8 | CH5 | CH4 |
| 9 | CH5 | CH2 |
| 10 | CH4 | CH0 |
| 11 | CH3 | CH2 |
| 12 | CH3 | CH1 |
| 13 | CH3 | CH0 |
| 14 | CH2 | CH1 |
| 15 | CH2 | CH0 |
| 16 | CH1 | CH0 |

| | Bus channel signals | | | | | | | |
|---|---|---|---|---|---|---|---|---|
| Row | CH7 | CH6 | CH5 | CH4 | CH3 | CH2 | CH1 | CH0 |
| 1 | 0 | 0 | 1 | 1 | 1 | 1 | 1 | 1 |
| 2 | 0 | 1 | 0 | 1 | 1 | 1 | 1 | 1 |
| 3 | 0 | 1 | 1 | 0 | 1 | 1 | 1 | 1 |
| 4 | 0 | 1 | 1 | 1 | 1 | 1 | 0 | 1 |
| 5 | 1 | 0 | 0 | 1 | 1 | 1 | 1 | 1 |
| 6 | 1 | 0 | 1 | 0 | 1 | 1 | 1 | 1 |
| 7 | 1 | 0 | 1 | 1 | 0 | 1 | 1 | 1 |
| 8 | 1 | 1 | 0 | 0 | 1 | 1 | 1 | 1 |
| 9 | 1 | 1 | 0 | 1 | 1 | 0 | 1 | 1 |
| 10 | 1 | 1 | 1 | 0 | 1 | 1 | 1 | 0 |
| 11 | 1 | 1 | 1 | 1 | 0 | 0 | 1 | 1 |
| 12 | 1 | 1 | 1 | 1 | 0 | 1 | 0 | 1 |
| 13 | 1 | 1 | 1 | 1 | 0 | 1 | 1 | 0 |
| 14 | 1 | 1 | 1 | 1 | 1 | 0 | 0 | 1 |
| 15 | 1 | 1 | 1 | 1 | 1 | 0 | 1 | 0 |
| 16 | 1 | 1 | 1 | 1 | 1 | 1 | 0 | 0 |

INKJET PRINTHEAD AND A METHOD OF INKJET PRINTING

CROSS-REFERENCE TO RELATED APPLICATIONS

This application is a National Stage Application of PCT/EP2005/013992, filed Dec. 23, 2005, which designates the United States.

BACKGROUND OF THE INVENTION

The present invention relates to an inkjet printhead and a method of inkjet printing. In particular, the invention relates to a thermal ink jet printhead and a method of thermal ink jet printing.

Inkjet printers print dots by ejecting very small drops of ink onto a print medium, generally paper, and typically include a movable carriage that supports one or more printheads each having ink ejecting nozzles (or orifices). The carriage traverses over the surface of the print medium, and the nozzles are controlled to eject droplets of ink at appropriate times pursuant to commands from a microcomputer or other controller, wherein the timing of the ejection of the ink drops is intended to correspond to the pattern of pixels of the image being printed.

The printheads of thermal ink jet printers include one or more ink reservoirs and a nozzle plate having an array of ink ejecting nozzles, a plurality of ink vaporization chambers in communication with the respective nozzles, and a plurality of heating resistors, known as "firing resistors", within the vaporization chambers and opposite the ink ejecting nozzles which are spaced therefrom by the vaporization chambers.

To print a single dot of ink, an electrical current from an external power supply is passed through a selected heating resistor. Localised heat transfer from the resistor to a defined volume of ink within the vaporization chamber vaporizes said volume of ink and causes it to expand thereby causing a droplet of ink to be ejected through the associated orifice onto a print medium. Properly arranged nozzles form a dot matrix pattern.

Also provided is a control unit, connected with the firing resistors for selectively activate the same. When a selected resistor is to be activated, and thus when the associated nozzle is to eject an ink droplet, the control unit generates a command signal, which causes a current to flow through the selected resistor, thereby heating the resistor. Such a command signal to the firing resistor is also referred to as the fire signal, which is generally provided as a pulse signal.

There is a trend in thermal inkjet technology to increase the number of nozzles constructed on a single printhead as well as to increase the firing rate of those nozzles. As the number of nozzles increases, the number of external connections increases, thereby increasing the hardware complexity of the printhead and of the wiring structure thereof. Multiplexing can be implemented in which some of the connections are shared by the ink firing resistors on a time division basis so as to reduce the number of interconnections to the printhead.

In a known multiplexing scheme, a gating transistor is electrically connected to each firing resistor and current to the resistor flows only when its associated gating transistor is selected.

U.S. Pat. No. 6,543,882 discloses a printhead in which firing resistors are arranged into a plurality of matrices of rows and columns. In more detail, the cited patent discloses a dynamic memory based ink firing cell including a firing resistor and a dynamic memory circuit. Each firing resistor is associated to a drive transistor. The gate of the drive transistor forms a storage node capacitance that functions as a dynamic memory element that stores resistor energising or firing data.

Some important parameters generally need to be taken into account when assessing the overall quality of a printhead and thus when designing a printhead. A first relevant parameter is the maximum firing rate, which is the firing rate, also referred to as "working frequency", at which each resistor can be successively energized. In other words, it takes some time to generate an ink drop, to eject the ink drop and to be ready to start a new generation of an ink drop from the same nozzle by heating the same resistor. Other parameters that can determine the functionalities of a printhead are the time between successive firings of different resistors (firing cycle) and the number of resistors that can be fired in a firing cycle.

The Applicant has observed that as long as the fire signal is in the high state (i.e., during the fire pulse), the printing data in each firing cell of the addressed matrix needs to be stable until the required pattern has completed the printing operation. It follows that the working frequency of a printhead having a dynamic memory element can be low, since each firing cell can not be loaded with new data until the fire pulse is over.

Applicant has further observed that when using a dynamic memory element in the firing cell, the printing data must be present up to the end of the firing step (typically corresponding to the printing operation): Therefore, before storing new data in a storage node, which functions as a dynamic memory element, it is necessary to wait until the end of the firing step which involves the drive transistor and the associated firing resistor of a firing cell.

The Applicant has realized that if the time during which a first firing step is carried out is employed for the loading of at least a portion of new data necessary to perform a second firing step, successive to the first firing step, the overall time of the printing operation can be considerably reduced. In other words, if during a firing step, i.e., during transferring of the pulse energy to the firing cells, loading of the energizing binary data for the next firing step is executed, an increase of the printhead working frequency can be achieved.

In particular, since a time-consuming step is that of receiving printing data from the control unit, such a step can be advantageously carried out while a first firing pulse is being transmitted from the control unit to the firing cell(s), thus saving time between the transmission of the first firing pulse and the transmission of a second (successive) firing pulse.

SUMMARY OF THE INVENTION

The present invention relates to an inkjet printhead comprising a plurality of firing cells being adapted to eject ink, typically ink droplets. A firing cell includes a heating resistor and a drive switch element, preferably a drive transistor, operatively connected to said heating resistor wherein current flows through the heating resistor when its associated drive switch element is in the ON position (for instance in a two-position switch element having ON and OFF positions). If the switch element is a drive transistor, selection of the transistor corresponds to the condition in which the transistor is rendered conductive. In particular, the firing cell is adapted to transfer heat from the heating resistor to a volume of ink in the vicinity of the heating resistor (typically within the vaporization chamber), thereby leading to the ejection of ink through a nozzle associated to the heating resistor.

According to the preferred embodiments, said plurality of firing cells are divided into a plurality of firing groups, each group being arranged as a matrix of rows and columns.

The Applicant has noted that when each matrix of a plurality of matrices is addressed separately from the other matrices and receives a firing signal at a different time than the other matrices, the nozzles associated with each matrix eject the ink droplets at a different time than the nozzles associated with the other matrices of the plurality. In other words, the firing step corresponding to a printing operation is carried out as a sequence of N firing signals, where N is the number of the plurality of matrices.

The Applicant has verified that, in order to obtain a precise printing by means of such a printhead, a complicated and not always completely reliable control technique has to be employed, since the firing signals sent to the matrices need to be synchronized with the movement of the carriage which supports the printhead.

This is because between two successive firing signals (each addressed to a different matrix) the printhead changes its position with respect to the recording medium, typically paper, to be printed. Therefore, the time at which each firing signal is transmitted to each of the N matrices should take into account the position at which the printhead is at that time.

In case of lack of an optimal synchronisation, the lines of ink dots printed on the medium would not be properly aligned, thereby decreasing significantly the quality of the printing process.

The Applicant has realized that by sending a single firing signal to all the matrices, it is possible to increase the number of firing cells which are simultaneously activated at each firing cycle (i.e., the time between successive firings of different resistors), so that a proper arrangement of the ink dots on the printed medium is achieved.

Since the firing cells of each matrix are energized at the same time, no change of the position of the printhead with respect to the recording medium occur during activation of the different matrices, thereby assuring a correct arrangement of the ink spots on the recording medium.

The Applicant has found that by employing two separated memory registers, a first memory register used to store printing data for the current printing step and a second memory register used to store printing data for the next printing step, it is possible to maintain a high maximum firing rate (i.e. the frequency at which each resistor can be successively energized, also referred to as the "working frequency" of the printhead), and to reduce the wiring connections necessary to address the firing cells for a correct working of the printhead. Loading of the second memory register can occur in a least partial overlap of the current printing step, preferably during the current printing step.

In particular, in a first aspect, the invention relates to an inkjet printhead, comprising:

a plurality of firing cells, each adapted to generate ink droplets, said firing cells being arranged to form a plurality of matrices;

a control circuit operatively associated with said firing cells for selectively activating the same;

wherein said control circuit comprises:

a first memory register for storing main printing data defining which firing cells have to be activated in a first printing operation;

a second memory register for storing auxiliary printing data defining which firing cells have to be activated in a second printing operation;

a processing unit operatively associated with said first and second memory registers for transferring said auxiliary printing data into said first memory register, thereby defining which firing cells have to be activated during said second printing operation;

a firing unit operatively associated with said matrices for sending to said matrices a single firing signal for each printing operation.

In a different aspect, the present invention relates to a method of printing, said method comprising the steps of:

arranging a printhead having a plurality of firing cells, each adapted to generate ink droplets, said firing cells being arranged to form a plurality of matrices;

storing in a first memory register main printing data adapted to select which firing cells have to be activated in a first printing operation;

sending to said matrices a first single firing signal for performing said first printing operation through the firing cells selected by said main printing data;

storing in a second memory register auxiliary printing data defining which firing cells have to be activated in a second printing operation;

transferring said auxiliary printing data into said first memory register, thereby defining new main printing data;

sending to said matrices a second single firing signal for performing said second printing operation through the firing cells selected by said new main printing data.

BRIEF DESCRIPTION OF THE DRAWINGS

Further features and advantages will become more apparent from the detailed description of a preferred, but not exclusive, embodiment of a printhead and of a method of printing, in accordance with the present invention. This description will be set out hereinafter with reference to the accompanying drawings, given by way of non-limiting example, in which.

DETAILED DESCRIPTION

With reference to the drawings, a printhead in accordance with the present invention has been generally denoted with reference numeral 1.

Figure 1:
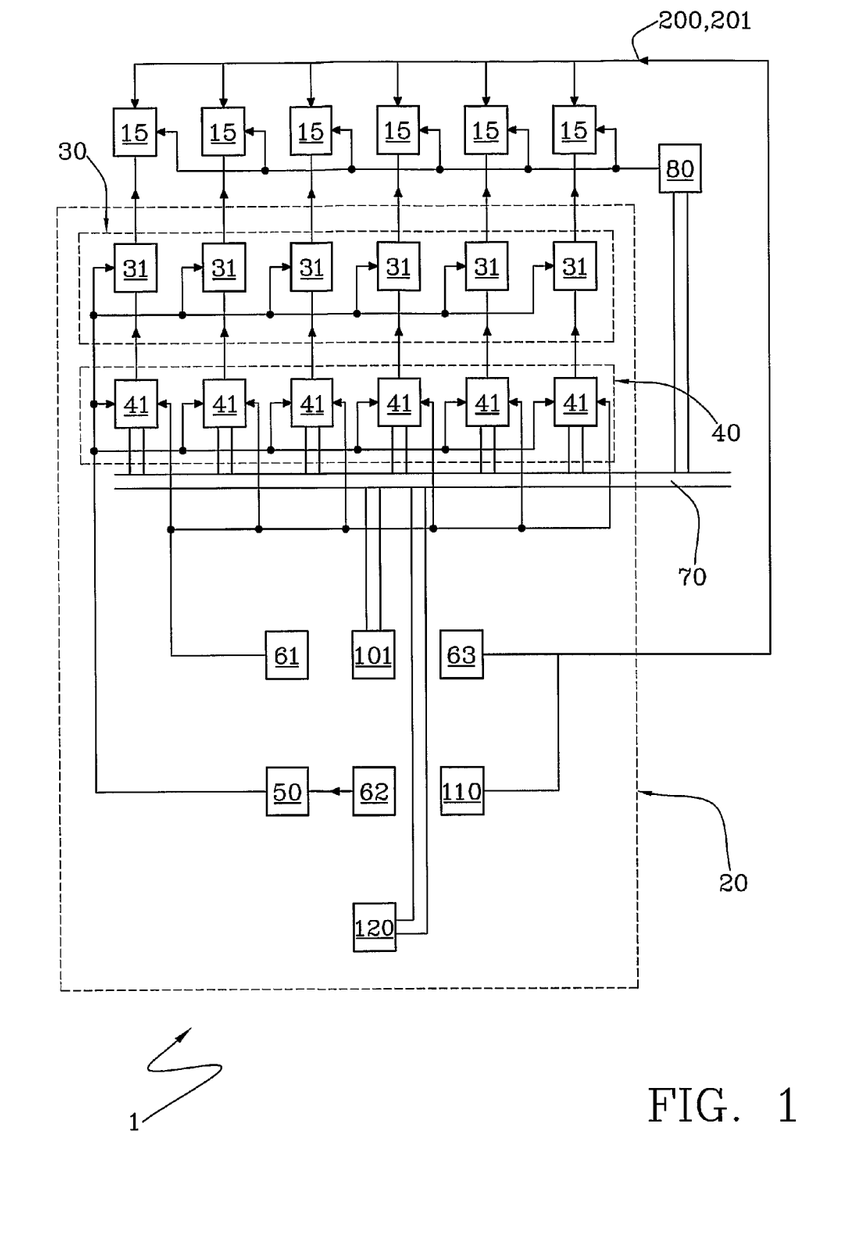
FIG. 1 is a block diagram of a printhead according to a preferred embodiment of the invention.
Figure 1A:
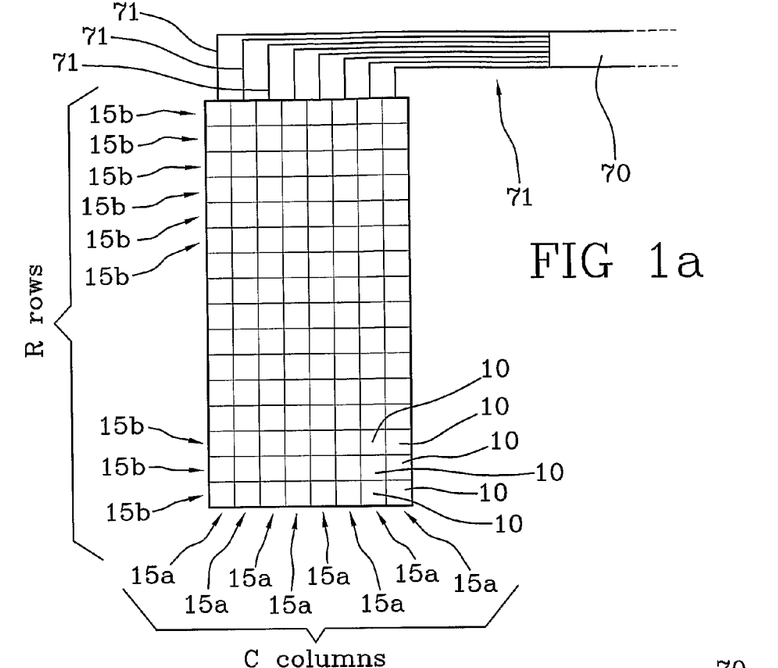
FIGS. 1a-1c show details of functional blocks of the diagram of FIG. 1.

The printhead 1 comprises a plurality of firing cells 10, each adapted to generate ink droplets (FIG. 1a).

In case the printhead is a thermal printhead, ink flows to each firing cell 10, which by means of a heating resistor selectively heats a small volume of ink in the vicinity of the resistor and causes the ejection of ink in the form of droplets through a nozzle opening associated to the heating resistor onto the medium to be printed.

The volume of each ink droplet can be, for example, of 4 pl (i.e. $4 \times 10^{-12}$ liters).

Figure 2:
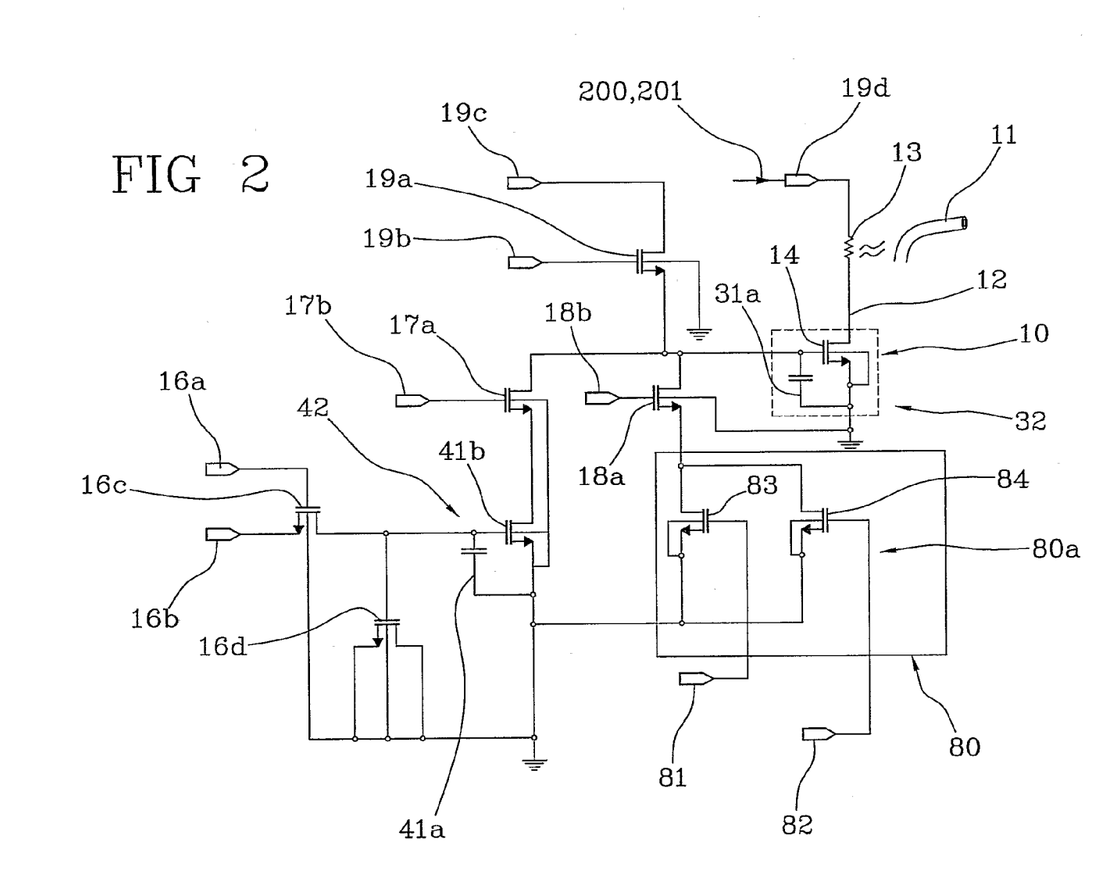
FIG. 2 is circuit diagram of a part of the printhead of FIG. 1.

Preferably, each firing cell 10 comprises a heating resistor 13 and a drive switch element 14, operatively associated (e.g. electrically connected) with heating resistor 13 for selectively supplying an electric signal to the resistor (FIG. 2).

When a firing cell 10 is to be activated, the drive switch element 14 is brought into conduction, so that a preset current flows through the respective firing resistor 13. The heat transferred from the firing resistor 13 to the ink causes the ink to expand and a droplet to be ejected.

The switch element 14 is preferably a drive transistor, more preferably an N-channel FET (field effect transistor). As shown in the embodiment of FIG. 2, one end of heating resistor 13 is electrically connected to the drain-source path of the drive transistor 14. The drain-source path is also electrically connected to a reference voltage, such as ground. The other end of heating resistor 13 is electrically connected to the firing line receiving firing signals 200 and 201 through input 19d. Firing signals are preferably in the form of energy pulses.

In order to eject the ink droplets onto the medium to be printed, the printhead 1 is provided with a plurality of nozzles 11, each nozzle being associated with a respective heating resistor 13.

The printing data according to which the firing cells 10 are selectively activated are provided by a control circuit 20 (FIG. 1).

The control circuit 20 comprises a first memory register 30, for storing main printing data defining which fire cells 10 have to be activated in a first printing operation, and a second memory register 40 for storing auxiliary printing data defining which firing cells 10 have to be activated in a second printing operation, preferably following said first printing operation.

The first printing operation is activated by means of a first firing signal 200, whereas the second printing operation is activated by means of a second firing signal 201.

It is to be noted that, within this context, with "printing operation" it is meant to include one or more steps, generally a group of steps, to be performed for printing a pattern defined by the data stored in the first memory register. Such group of steps basically comprises selection and activation of the necessary firing cells 10 according to the main printing data stored in the first memory register at a certain time before the firing.

Preferably, the first memory register 30 is divided into a plurality of first memory cells 32 (FIG. 1b), each memory cell 32 being associated with a respective firing cell 10 for storing the main printing data concerning the respective firing cell 10.

In particular, as shown in FIG. 2, each first memory cell 32 of the first memory register 30 comprises a capacitor 31a. The gate of drive transistor 14 is electrically connected to capacitor 31a. When the capacitor is charged (i.e., a bit of main printing data is stored), the logic level of the drive transistor is "1", while when the capacitor is discharged, the logic level of the drive transistor is "0".

According to a preferred embodiment, the capacitor 31a is not a separated element from the drive transistor 14, but is the parasitic capacitance of the gate of transistor 14. The parasitic capacitance can be for instance of 0.1 pF or less.

Preferably the second memory register 40 comprises a plurality of second memory cells 42, each associated with a respective firing cell 10 for storing the auxiliary printing data concerning such respective firing cell 10.

In particular, as shown in FIG. 2, each second memory cell 42 of the second memory register 40 comprises a capacitor 41a. When the capacitor is charged, (i.e., a bit of main printing data is stored), the logic level of the drive transistor is "1", while when the capacitor is discharged, the logic level of the drive transistor is "0".

According to a preferred embodiment, the capacitor 41a is the parasitic capacitance of the gate of a drive transistor 41b, which will be described hereinafter. The parasitic capacitance can be for instance of 0.1 pF or less.

Each second memory cell 42 of the second memory register 40 is further connected to a respective first memory cell 32 of the first memory register 30, so that, as it will be described hereinafter, when the first memory cell 32 is discharged from the main printing data, auxiliary printing data can be transferred from the corresponding second memory cell 42 to the first memory cell 32 and the second printing operation can be carried out.

In particular, with reference to FIG. 2, the capacitor 41a is electrically connected to the gate of a drive transistor 41b. The drain-source path of drive transistor 41b is electrically series-connected with the drain-source path of transistor 17a, which in turn is connected with an end of capacitor 31a.

When a bit of printing information is to be transferred from the second memory cell 42 to the first memory cell 32, transistor 17a is rendered conductive through a signal received by input 17b, so that the second memory cell 42 and the first memory cell 32 are connected to each other and the bit of data stored in capacitor 41a can be transferred to capacitor 31a.

Preferably, the firing cells 10 are arranged so as to form a plurality of N matrices 15 (N>1), each matrix being defined by a number C of columns and a number R of rows. According to a preferred embodiment, each matrix has the same number of rows and columns.

Preferably, the first memory cells 32 of the first memory register 30 are arranged so as to form a plurality of matrices 31 of said first memory register 31, each matrix 31 being associated with a respective matrix 15 of firing cells 10. Preferably, each of such matrices is defined by a number of columns equal to C and a number of rows equal to R, so as to form a memory matrix 31 of the same dimension as the matrix 15 of firing cells 10.

Preferably, the second memory cells 42 of the second memory register 40 are grouped to form a plurality of matrices 41 of said second memory register 40, each matrix 41 being associated with a respective matrix 15 of firing cells 10. Advantageously, each matrix 41 is defined by a number of columns equal to C and a number of rows equal to R.

For example, the printhead 1 can comprise six matrices of firing cells, six matrices of first memory cells (first memory register), and six matrices of second memory cells (second memory matrices).

Each matrix can have 8 columns and 16 rows, and a total of 128 cells; therefore 768 firing cells, 768 first memory cells and 768 second memory cells can be provided.

The control circuit 20 further comprises a processing unit 50, operatively associated with the first and the second memory registers 30, 40 for transferring the auxiliary printing data into the first memory register 30, thereby defining new main printing data, and preferably for loading new auxiliary printing data into said second memory register 40.

In other words, the first memory register 30 contains the main printing data for the first printing operation; the firing cells 10 are activated by a first firing signal 200 to execute said first printing operation.

When the first printing operation is completed, the auxiliary printing data are transferred from the second to the first memory register 40, 30, so that such auxiliary printing data define new main printing data, i.e. the printing data to be employed in the successive second printing operation.

By means of a second firing signal 201, the firing cells 10 are activated to complete the second printing operation.

Printing process can continue by loading new auxiliary printing data into the second memory register 40, so that another printing operation can be performed when such new auxiliary data are transferred into the first memory register 30.

Preferably, the step of loading new auxiliary printing data into said second memory register 40 is carried out at least partially during said second printing operation.

Preferably, the step of loading new auxiliary printing data into said second memory register 40 is carried out at least partially during said second printing operation.

Preferably, loading of new auxiliary data into the first memory register is carried out after the end of the second printing operation.

Figure 3:
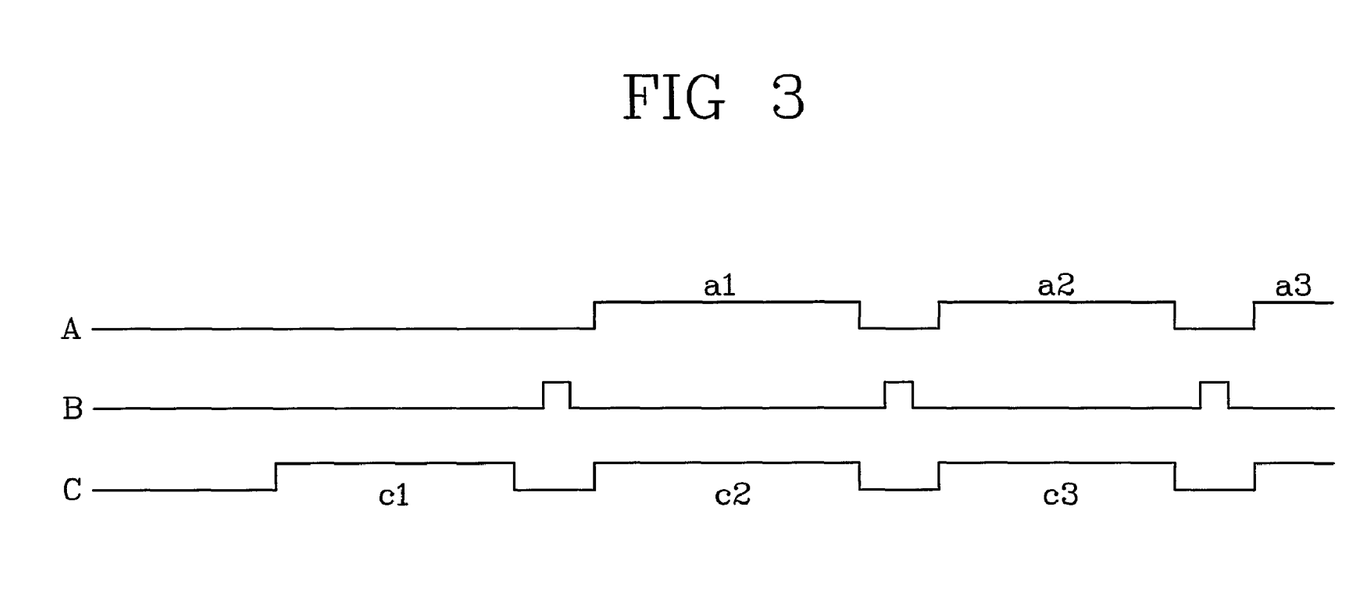
FIG. 3 is a schematic diagram showing signals used in the printhead of FIG. 1 as a function of time.

FIG. 3 shows a time diagram that schematically represents firing signals for activating respective printing operations a1, a2 and a3 (A); the transfer signal for activating the transfer of data from the second to the first memory register (B), and the data loading signal, for activating the loading of new auxiliary data into the second memory register (C).

In the figure, three printing operations (a1, a2 and a3) and the corresponding loading operations c1, c2 and c3 are illustrated. As schematically illustrated in FIG. 3, loading of auxiliary data into the second memory register can be advantageously carried out in at least partial overlap with a printing operation. For instance, during the first printing operation (a1), loading of data (c2) for carrying out the second printing operation (a2) is performed.

The control circuit 20 can comprise a first timing unit 61 operatively associated with the second memory register 40 for activating the storing of the auxiliary printing data into the second memory register 40 during the first printing operation.

In such a way, while the first printing operation is carried out according to the main printing data stored in the first memory register 30, the auxiliary printing data 40 are loaded into the second memory register 40, thereby rendering the auxiliary data available to be transferred into the first memory register 30 upon conclusion of the first printing operation.

The control circuit 20 can comprise a second timing unit 62, operatively associated (e.g., electrically connected) with the processing unit 50 for activating the transfer of the auxiliary printing data from the second memory register 40 into the first memory register 30 after the end of the first printing operation.

After the first printing operation is completed, the content of the first memory register 30 can be updated by loading therein the auxiliary printing data (i.e. the new main printing data) for the second printing operation.

The control circuit 20 can comprise a third timing unit 63 for activating the second printing operation after the end of the transfer of the auxiliary printing data from the second memory register 40 into the first memory register 30.

Preferably, in order to connect the control circuit 20 to the matrices 15, and in particular to the firing cells 10 thereof, the printhead 1 is provided with a bus connection 70.

According to the functional step to be performed (i.e., loading of data or addressing of the rows before the firing pulse), the bus connection 70 can carry different types of data.

Figure 5A:
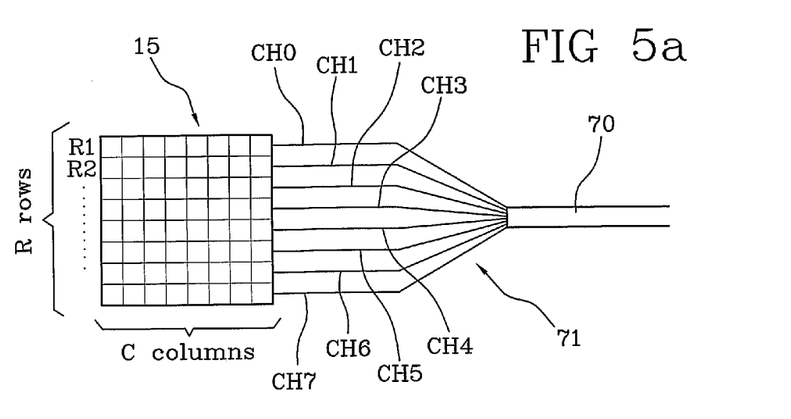
FIGS. 5a and 5b show different embodiments of the connection between the bus and a matrix of firing cells of the printhead of FIG. 1.
Figure 5B:
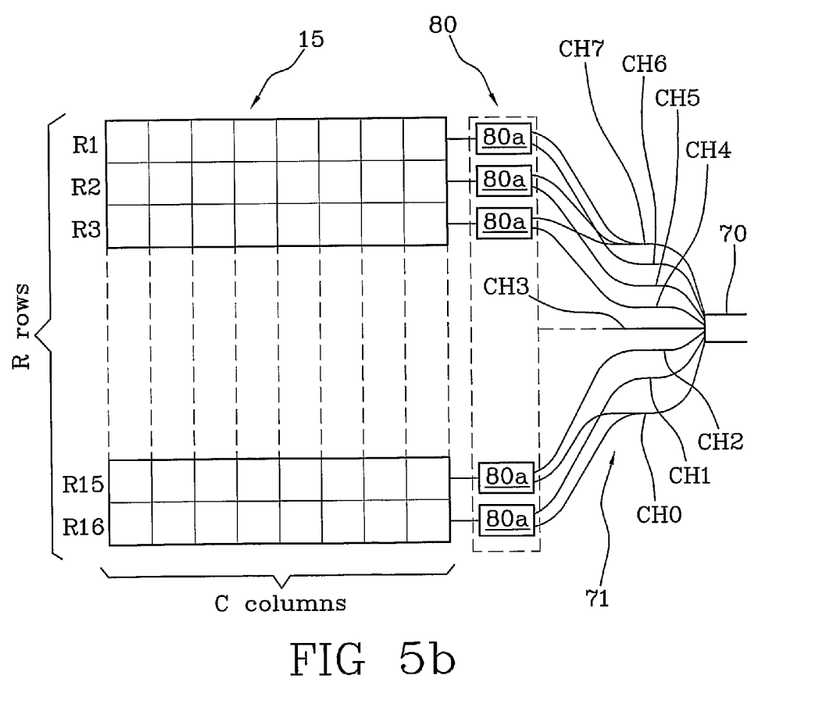

According to a preferred embodiment, each row 15a of each matrix 15 of firing cells 10 is connected to a respective channel 71 of the bus 70, and each column 15b of each of said matrices 15 is connected to at least one respective channel 71 of the bus 70; such connections have been shown in separated FIGS. (1a and 5a, 5b) only for sake of clarity.

Figure 1B:
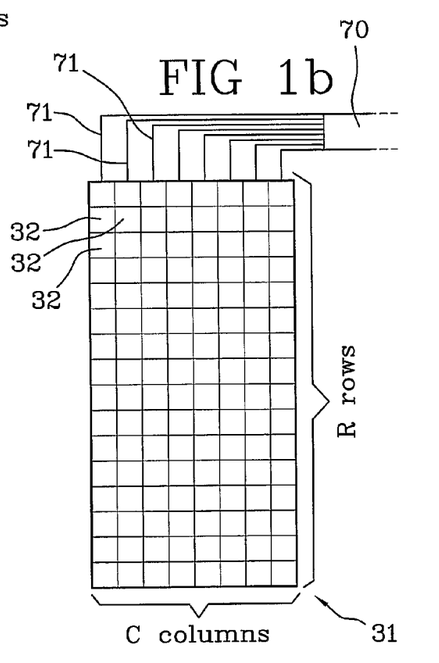
Figure 1C:
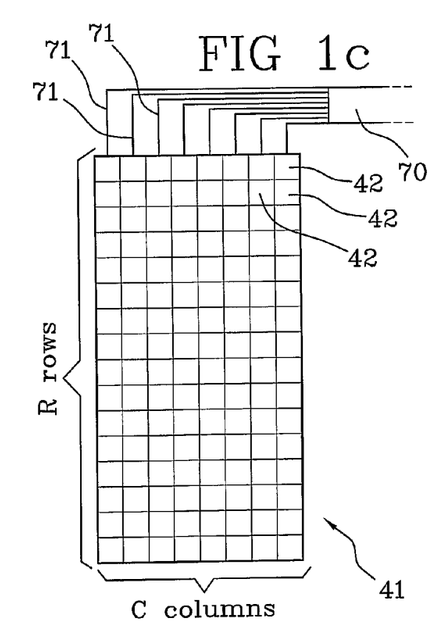

For example, when the auxiliary printing data must be loaded into the second memory register 40, the bus connection 70 carries the printing data for each column of the addressed matrix 41 of said second memory register 40 (FIG. 1c).

According to a preferred embodiment of the invention, the bus connection 70 has a number M of channels 71 (FIGS. 1a-1c) equal to C, i.e. the number of columns of each matrix 15 of firing cells 10, and more preferably equal to the number of columns of each matrix of both the first and the second memory register 30, 40.

Therefore, each column 15a of each matrix 15 of firing cells 10 is preferably associated with a respective channel 71 of the bus connection 70, so that such respective channel 71 carries the printing data concerning said column 15a. Each column of each matrix of the second memory register 40 is connected to a respective channel 71 of the bus connection 70, which is the same channel as that associated to the first column 15a of each firing matrix 15. In the example of FIG. 1, wherein the second memory register 40 comprises six matrices, the first column of the first matrix, the first column of the second matrix, . . . , the first column of the sixth matrix are connected to the first channel of the bus connection; the second column of the first matrix, the second column of the second matrix, . . . , the second column of the sixth matrix are connected to the second channel of the bus connection, etc.

In the example illustrated in FIGS. 1a-1c, the bus 70 has eight channels 71, each channel corresponding to a column of each matrix 15, 31, 41 (i.e., C=8).

According to a preferred embodiment, the matrices 15 of firing cells 10 are horizontally arranged side-by-side, so that the rightmost column of each matrix is adjacent and substantially parallel to the leftmost column of the right adjacent matrix.

Preferably, also the matrices of the first memory register 30 and the matrices of the second memory register 40 are arranged in such a way.

When auxiliary printing data are to be stored in the second memory register 40, the matrices thereof are selectively and progressively enabled to store the data carried by the bus 70.

It is to be noted that the data carried by the bus channels 71 are input to all the matrices of the second memory register 40 at the same time. However, as it will become clear in the following, only the matrix which is selected through the respective strobe signal will be loaded with the printing data carried at a certain time.

For example, when auxiliary printing data are to be stored in the first matrix 41 of the second memory register 40, each channel 71 of the bus 70 carries the data for the respective column; at the same time, a strobe signal is sent to the such first matrix (and not to the other matrices of the second memory register 40), so that the data carried by the bus connection 70 are stored only in the first matrix.

Preferably, in all the memory cells of each column of the first matrix is loaded the same piece of data (i.e., for example, if the third channel of the bus connection 70 carries a "0", in all the cells of the third column of the first matrix a "0" will be stored); the selection of the row which will be activated for the printing operation, will be carried out later, by means of a selection unit 100 (that will be described in more detail in the following).

Then, the same steps are performed for each of the other matrices of the second memory register 40. The data for the second matrix are carried by the bus connection 70, and a strobe signal is sent to the second matrix; successively, the data for the third matrix are carried by the bus connection 70 and a strobe signal is sent to the third matrix, etc.

In practice, a strobe signal is selectively sent to each matrix of the second memory register 40, so that each of said matrices is selectively enabled to store the new printing data carried by the bus 70.

Accordingly, all the matrices of the second memory register 40 are progressively loaded with the respective auxiliary printing data.

As disclosed above referring to the first matrix of the second memory register 40, also in all the other matrices of the second memory register 40 all the cells of each column store the same piece of data; in other words, in each cell of the first column, a certain piece of data (or bit) will be stored; in each cell of the second column another piece of data (or bit) will be stored, etc.

In such a way, the succession of data stored in the rows of a certain matrix will be the same.

No selection of rows is performed at this stage of the process; the row 15*b* enabled for printing will be selected by a selection unit 100 that will be described in more detail hereinafter.

While the auxiliary printing data are loaded into the second memory register 40, the first printing operation according to the main printing data stored in the first memory register 30 is carried out.

Each matrix of the first memory register 30 contains the main printing data, stored therein during a previous data loading step.

Preferably, in all the cells of each column of the matrices of the first memory register 30 is loaded the same piece of data (i.e., for example, in all the cells of the second column of a certain matrix a "0" will be stored, whereas in all the cells of the fourth column of the same matrix a "1" will be stored).

In other words, the printing data stored at a certain time in each matrix of the first memory register 30 concern only one row of firing cells 10; the printing data stored in each row of a matrix of the first memory register are the same as the printing data stored in the other rows of the same matrix.

As will be disclosed in the following, the selection of the row of firing cells that will be activated is performed by a selection unit (addressing block) 101.

The main printing data stored in each matrix of the first memory register 30 preferably concern only one row 15*b* of firing cells 10 of the corresponding matrix 15.

In order to select the firing cells 10 to be activated in each printing operation, the control circuit 20 comprises a selection unit 101.

In more detail, the selection unit comprises an addressing block 101 for selectively addressing at least one row 15*b* at a time of each matrix 15, said at least one row 15*b* including firing cells 10 that may be energized during the printing operation.

In practice, the selection unit, and in particular the addressing block 101, selects one row at a time of the matrices 15.

Preferably, the matrices 15 of firing cells 10 are arranged side by side so that each row of a matrix 15 is axially aligned with the corresponding row of each of the adjacent matrix or matrices.

Although it is preferred that each matrix of the first and the second memory register has the same dimension as the matrix of the firing cells (i.e., R×C), the present invention envisages the case that the memory matrices have different dimensions from those of the matrices of the firing cells.

The addressing block 101 simultaneously selects one row of each matrix 15. For example, the addressing block 101, at the start of the addressing step, selects the first row of the first matrix, the first row of the second matrix, . . . up to the first row of the N-th matrix (in FIG. 1, N=6), for performing the first printing operation.

Then, for the second printing operation, the addressing block 101 selects the second row of the first matrix 15, the second row of the second matrix, . . . up to the second row of the N-th matrix.

The control circuit 20 further comprises a firing unit 120, for sending firing signals 200, 201 to the firing cells 10 to activate the same.

In particular, the firing unit 120 sends a single firing signal to all the matrices 15 for each printing operation.

Preferably, the firing unit 120 sends a first firing signal 200 to all matrices 15 for the first printing operation, and a second firing signal 201 to all matrices 15 during the second printing operation.

In particular, the firing signal 200, 201 is sent to all the firing cells 10 of each matrix 15, irrespective of which cells 10 will be set to eject ink droplets according to the printing data. The selection of the cells to be activated (i.e. of the row to be activated) is performed by the selection unit 101.

In such a way, the following basic steps are carried out:

storage of the main printing data in each cell of the first memory register 30;

selection of rows 15*b* performed by the selection unit, and in particular by the addressing block 101;

transmission of a firing signal to all the firing cells 10.

Therefore, each firing cell 10 ejects an ink droplet when the following conditions are met:

in the cell 32 of the first memory register 30 corresponding to such firing cell 10 a bit of data which means "ejection" (for example, a "1") is stored;

the row 15*a* to which such firing cell 10 belongs is selected by the selection unit 100;

a firing signal (for example, the aforementioned first or second firing signal 200, 201) is received by said firing cell.

The drive switch elements 14 of the selected firing cells 10 causes a preset current to flow through the selected heating resistors 13, so that a selected pattern of droplets are ejected onto the printing medium.

It is to be noted that, at the start of a printing operation, each row of the first memory register 30 stores the same main printing data, i.e. the same succession of bits is present at each row of the first memory register 30.

The selection is performed when the selection unit (i.e. the addressing block 101) is activated, so that only the selected row (that may comprise both ejecting and non-ejecting cells) realizes the printing pattern identified by the main printing data of the current printing operation.

According to a first embodiment, the number R of rows of each matrix 15 is equal or smaller than the number of channels 71 of the bus connection 70. FIG. 5*a* illustrates an embodiment in which each row 15*b* is associated with a corresponding channel 71, so that when a preset row 15*b* is to be selected, a selection signal (for example, a "1" pulse) is sent by the addressing block 101 through the channel 71 associated with such preset row.

In practice, in order to select a row of a matrix 15 which has to be enabled to eject ink during a certain printing operation, a single signal (i.e. the aforementioned selection signal) is transmitted from the addressing block 101 to such a row, so that that row is activated in the printing operation.

According to a second embodiment, the number R of rows of the matrices 15 is larger than the number of channels 71 (FIG. 5*b*). In such a case, the available channels are not sufficient for address in a one-to-one correspondence all the rows 15*b*. The control circuit 20 comprises a decoding unit 80, operatively interposed between the bus connection 70 and the matrices 15 for associating each row 15*b* of such matrices 15 with a combination of channels 71, e.g., a combination of two channels is associated to a row 15a.

Thus, each single channel 71 can be connected to more than one row 15b.

Figure 4A:
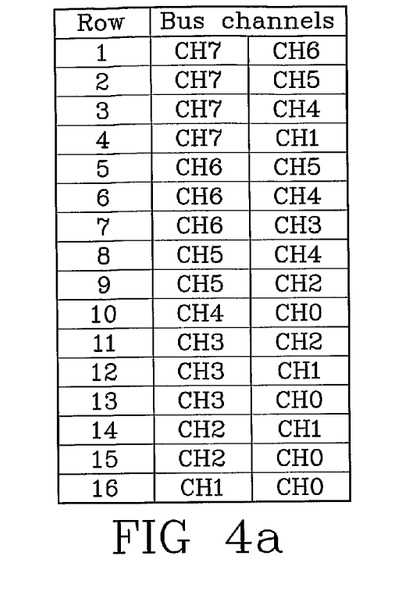
FIGS. 4a and 4b are tables showing connections used in the printhead of FIG. 1 and data transmitted thereby.

By way of example, in case a bus having eight channels is employed to address sixteen rows, FIG. 4a shows a table in which each of the rows 15b of the matrices 15 is identified by a combination of channels 71. For example, row 1 corresponds to a combination of channels 7 and 6.

Figure 4B:
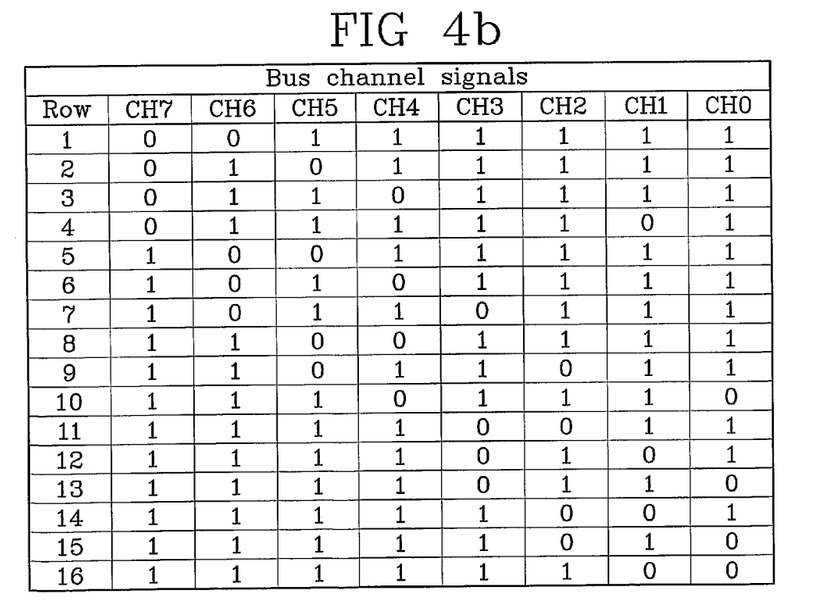

If the digital electronic control uses negative, bipolar logic, a positive voltage represents logic "0". Given the value "0" to the selected channels, and the value "1" to the non-selected channels, the corresponding codes of FIG. 4b are obtained.

Preferably, the bus connection 70 includes only a single bus; in such a case the overall number of connection between the control circuit 20 and the matrices 15 and memory registers 30, 40 is significantly reduced, as well as the overall hardware complexity of the printhead 1 in accordance to the invention.

The control circuit 20 can also comprise a heat control circuit 110 for causing at least a preset group of firing cells 10 to be pre-heated at a given temperature before one or more printing operations begin.

The heat control circuit 110 has the general purpose of maintaining the temperature of the firing cells substantially constant in time, so as to avoid variations of the volume of the generated droplets during a printing operation.

In particular, according to a preferred embodiment, all the firing cells 10 are heated at about 50° C. before each printing operation is performed.

The duration of each of the pulses sent to the firing cells for the pre-heating step may vary according to the volume of the drops to be ejected (the smaller the drops, the shorter the pulses); for example, such duration can be comprised between 200 ns and 500 ns.

According to another preferred embodiment, only the firing cells 10 belonging to the row 15b selected for the next printing operation are pre-heated.

The pre-heating pulse generated by the heat control circuit 110 is preferably shorter than the firing pulse (or firing signal) generated by the firing unit 120, thereby maintaining the temperature of the firing cell sufficiently high, but without generating an ink droplet.

Preferably, the duration of a firing pulse is comprised between 1 µs and 2 µs. For example, fire pulse duration is of about 1.5 µs.

Preferably, the printhead 1 further comprises a setting unit 90 operatively associated with the first memory register 30 for setting the first memory cells of said first memory register 30 into the same condition before the transfer of the auxiliary printing data from the second memory register 40.

In practice, the first memory cells 32 of the first memory register 30 are drivable between two operating conditions, according to the printing data; such conditions can correspond, for example, to a "0" state and a "1" state.

The setting unit 90, before the auxiliary data are transferred from the second to the first memory register 40, 30, sets all the first memory cells 32 of the first memory register 30 into the same logical condition (i.e. the "0" state or the "1" state).

In such a way, the previously stored data is deleted from the first memory register so that the auxiliary printing data can be loaded into reset cells of first memory register 30.

Preferably, the first memory cells 32 of the first memory register 30 are set in the "1" state; then, the cells which are not intended to activate the corresponding firing cells 10 will be driven into the "0" condition, while the first memory cells 32 which are intended to activate the corresponding firing cells 10 will remain in the "1" condition.

Preferably the working frequency of the printhead 1 is comprised between 15 kHz and 20 kHz, and in particular substantially equal to about 18 kHz.

FIG. 2 shows a preferred embodiment of a firing cell 10, associated with a first memory cell 32 of the first memory register 30 and a second memory cell 42 of the second memory register 40.

Through input 16a a strobe signal is received, for activating transistor 16c and enabling storage of the auxiliary printing data into the second memory cell 42; the auxiliary printing data is received through input 16b.

Capacitor 41a is the storage element in which the auxiliary data is loaded; preferably, such capacitor 41a is a parasitic capacitor of transistor 41b, and in particular the capacitor defined between gate and source of transistor 41b.

An auxiliary drive transistor 16d can be added, in order to increase the duration of the storage capability of the second memory cell 42.

As already mentioned, the firing cell 10 comprises the heating resistor 13 and the drive switch element (transistor) 14; the first memory cell 32 of the first memory register 30 associated with such firing cell 10 is defined by capacitor 31a.

The heating resistor 13 can have, for example, an electrical resistance of about 120Ω; the voltage at which it is powered can be, for example, comprised between 12 V and 13 V.

The capacitor 31a is preferably a parasitic capacitor of transistor 14, defined between the gate and the source of such transistor.

The transfer of the auxiliary printing data from the second memory cell 42 to the first memory cell 32 is carried out by means of transistor 17b, which receives an enabling signal from the processing unit 50 through input 17b.

If the transistor 41b is ON (i.e. a "1" is stored in the capacitor 41a), the capacitor 31a is discharged and the firing cell 10 will not be energized.

If the transistor 41b is OFF (i.e. a "0" is stored in the capacitor 41a) the capacitor 31a will maintain its charge and the firing cell 10 will be able to be activated.

It is to be noted that such step (i.e. discharging the capacitors 31a corresponding to firing cells which are not to be activated) is to be carried out in case a setting (or precharge) step is performed before transfer of the auxiliary data into the first memory register. In this case, just before such transfer, the capacitor 31a is always charged.

It is clear that the above described working scheme can be easily modify to adapt it to a circuit in which a precharge operation is not performed.

The setting or precharge step is carried out by means of transistor 19a, powered through input 19c and enabled through input 19b.

To select a firing cell 10, a decoding unit 80 can be provided; preferably, the decoding unit 80 comprises a plurality of decoding circuits 80a.

In a preferred embodiment, each firing cell 10 is associated with a respective decoding circuit 80a; in another preferred embodiment, each row of firing cells is associated with a respective decoding circuit 80a.

The decoding circuits 80a are each interposed between the bus connection 70 and a respective firing cell 10 or row of firing cells 10.

The decoding circuit shown in FIG. 2 has two inputs 81, 82, each connected to a respective channel 71 of the bus connection 70.

According to the signal transmitted through channels 71, the firing cell 10 can be selected or not.

Again referring to a circuit in which a precharge is performed, the decoding circuit 80a comprises a couple of transistors 83, 84, respectively connected with inputs 81, 82.

If both inputs 81, 82 carry a "0" signal (i.e. the row to which the firing cell 10 is selected—see the tables of FIGS. 4a and 4b), the capacitor 31a will maintain its charge and the firing cell 10 will be able to be activated.

Otherwise, if at least one of inputs 81, 82 carries a "1", the capacitor 31a will be discharged and the firing cell 10 will not be able to be energized.

In the circuit of FIG. 2, the selection of the row is enabled by transistor 18a, which is properly activated by a command signal through input 18b.

Input 19d is adapted to receive the firing signal, so that, if the row which the firing cell 10 belongs to is selected, and the main printing data stored in the capacitor 31a is a "1", when the firing signal is received the heating resistor 13 properly causes an ink droplet to be generated and ejected through the nozzle 11 associated with the firing cell 10.

The function of the circuit 110 for the pre-heating step is performed by means of the transistor 18a employing inputs 18b and 19d. The row selected for the printing operation to be performed is activated, and through input 19d a pre-heating signal (e.g., a pre-heating pulse) is supplied to the firing cell 10.

The duration of the pre-heating firing pulse is preferably comprised between 5% and 40%, and in particular between 10% and 20%, of the duration of the firing signal (or firing pulse) transmitted for generating the ink drops.

The invention claimed is:

1. An inkjet printhead comprising:
   a plurality of firing cells, each adapted to eject ink, said firing cells being arranged so as to form a plurality of matrices of rows and columns;
   a control circuit operatively associated with said firing cells for selectively activating the same;
   wherein said control circuit comprises:
   a first dynamic memory register for storing main printing data defining which firing cells have to be activated during a first printing operation;
   a second dynamic memory register for storing auxiliary printing data;
   a processing unit operatively associated with said first and second memory registers for transferring said auxiliary printing data into said first memory register, thereby defining which firing cells have to be activated during a second printing operation;
   a firing unit operatively associated with said matrices for sending a firing signal, common to all of the matrices, for each of said first and second printing operations.

2. An inkjet printhead as claimed in claim 1 wherein said control circuit further comprises a first timing unit operatively associated with said second memory register for activating the storing of said auxiliary printing data into said second memory register during a time that at least partially overlaps said first printing operation.

3. An inkjet printhead as claimed in claim 1 wherein said control circuit further comprises a second timing unit operatively associated with said processing unit for activating the transfer of said auxiliary printing data from said second memory register into said first memory register upon completion of said first printing operation.

4. An inkjet printhead as claimed in claim 3, wherein said control circuit further comprises a third timing unit for activating said second printing operation after the end of said transfer.

5. An inkjet printhead as claimed in claim 1, wherein said firing unit activates each of said first and second printing operations by sending a single firing signal common to all of said matrices.

6. An inkjet printhead as claimed in claim 1, wherein said firing cells are arranged to define a plurality of matrices, each matrix of said plurality having a number C of columns and a number R of rows of firing cells.

7. An inkjet printhead as claimed in claim 1, further comprising a bus connection for connecting said control circuit with said matrices.

8. An inkjet printhead as claimed in claim 7 wherein the number R is larger than the number of channels of said bus; further comprising a decoding unit operatively interposed between said bus and said matrices of firing cells for associating each row with a respective combination of channels of said bus.

9. An inkjet printhead as claimed claim 1, wherein said first memory register comprises a plurality of first memory cells arranged so as to form a plurality of first memory matrices, each first memory matrix being associated with a respective matrix of firing cells and being adapted to store main printing data related to the firing cells of said respective matrix.

10. An inkjet printhead as claimed in claim 9 wherein each of said first memory cells is drivable between at least two different operating conditions, according to said printing data.

11. An inkjet printhead as claimed in claim 10 wherein said control circuit further comprises a setting unit operatively associated with said first memory register for setting the first memory cells of said first memory register into the same logical condition before the transfer of said auxiliary printing data from said second memory register.

12. An inkjet printhead as claimed in claim 1, wherein said second memory register comprises a plurality of second memory cells arranged so as to form a plurality of second memory matrices, each second memory matrix being associated with a respective matrix of firing cells and being adapted to store auxiliary printing data related to the firing cells of said respective matrix.

13. An inkjet printerhead as claimed in claim 1 wherein said control circuit further comprises a selection unit operatively associated with said firing cells for selecting which firing cells must be activated in each printing operation.

14. An inkjet printhead as claimed in claim 1 wherein said processing unit is operatively associated with said second memory register for loading new auxiliary printing data into said second memory register.

15. A method of inkjet printing comprising:
   arranging a printhead having a plurality of firing cells, each adapted to eject ink, said firing cells being arranged so as to form a plurality of matrices;
   storing in a first dynamic memory register main printing data adapted to select which firing cells have to be activated in a first printing operation;
   sending a first firing signal, common to all the matrices, a first firing signal for performing said first printing operation through the firing cells selected by said main printing data;
   storing in a second dynamic memory register auxiliary printing data;
   transferring said auxiliary printing data into said first memory register, thereby defining which firing cells have to be activated in a second printing operation;
   sending a second firing signal, common to all of the matrices, a second firing signal for performing said second printing operation through the firing cells selected by said new main printing data.

16. A method as claimed in claim 15 wherein said step of storing said auxiliary printing data in said second memory register is carried out at least partially during said first printing operation.

17. A method as claimed in claim 15 wherein the step of transferring said auxiliary printing data from said second memory register into said first memory register is carried out after the end of said first printing operation.

18. A method as claimed in claim 15 wherein said second printing operation is carried out after the end of said step of transferring said auxiliary printing data from said second memory register into said first memory register.

19. A method as claimed in claim 15 wherein each of said printing operations comprises a step of sending to all said matrices a single firing signal substantially at the same time.

20. A method as claimed in claim 15 wherein each of said matrices is defined by a number C of columns and a number R of rows of firing cells; said method further comprising a step of sequentially addressing the rows of said matrices for identifying therein the firing cells to be activated in each printing operation.

21. A method as claimed in claim 15 wherein said first memory register comprises a plurality of first memory cells, each associated with a respective firing cell and storing main printing data therefor, and wherein each first memory cell is drivable between at least two operating conditions, according to said printing data.

22. A method as claimed in claim 21 further comprising a step of setting each of said first memory cells into the same logical condition, before a printing operation is performed.

23. A method as claimed in claim 15 further comprising a step of heating a preset group of firing cells before one or more printing operations are carried out.

24. A method as claimed in claim 23 wherein said preset group of firing cells are the firing cells to be activated in a printing operation to be performed.

* * * * *